US006938241B1

(12) United States Patent
Whitehill

(10) Patent No.: US 6,938,241 B1
(45) Date of Patent: Aug. 30, 2005

(54) COMPILER INDEPENDENT BIT-FIELD MACROS

(75) Inventor: Clifford A. Whitehill, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 591 days.

(21) Appl. No.: 10/021,606

(22) Filed: Dec. 10, 2001

(51) Int. Cl.[7] .................................................. G06F 9/44
(52) U.S. Cl. ..................................................... 717/117
(58) Field of Search ........................................ 717/117

(56) References Cited

U.S. PATENT DOCUMENTS

| | | | | |
|---|---|---|---|---|
| 4,199,811 A | * | 4/1980 | Borgerson et al. ............. | 712/23 |
| 4,667,290 A | * | 5/1987 | Goss et al. .................. | 717/147 |
| 4,791,550 A | * | 12/1988 | Stevenson et al. ........... | 718/106 |
| 5,339,433 A | * | 8/1994 | Frid-Nielsen ................ | 717/141 |
| 5,432,903 A | * | 7/1995 | Frid-Nielsen ................ | 345/763 |
| 5,557,730 A | * | 9/1996 | Frid-Nielsen ................ | 345/839 |
| 5,655,093 A | * | 8/1997 | Frid-Nielsen ................ | 345/856 |
| 5,680,585 A | * | 10/1997 | Bruell ........................ | 703/26 |
| 5,740,444 A | * | 4/1998 | Frid-Nielsen ................ | 717/102 |
| 5,761,646 A | * | 6/1998 | Frid-Nielsen et al. .......... | 705/9 |
| 6,292,822 B1 | * | 9/2001 | Hardwick ................... | 718/105 |
| 6,298,389 B1 | * | 10/2001 | Gerhardt .................... | 719/313 |
| 6,442,533 B1 | * | 8/2002 | Hinkle ...................... | 705/35 |
| 6,466,999 B1 | * | 10/2002 | Sliger et al. ................. | 710/68 |
| 6,477,080 B2 | * | 11/2002 | Noble ....................... | 365/154 |
| 6,477,683 B1 | * | 11/2002 | Killian et al. ................. | 716/1 |
| 6,516,461 B1 | * | 2/2003 | Ichisugi ..................... | 717/144 |
| 6,530,080 B2 | * | 3/2003 | Fresko et al. ................ | 717/166 |
| 6,574,790 B1 | * | 6/2003 | Abramson et al. ........... | 717/100 |
| 6,634,022 B1 | * | 10/2003 | Leermakers ................. | 717/158 |
| 6,675,354 B1 | * | 1/2004 | Claussen et al. ............. | 715/513 |
| 6,701,338 B2 | * | 3/2004 | Narad et al. ................. | 708/525 |

OTHER PUBLICATIONS

Design and Evolution of C++, Bjarne Stroustrup, pp. 423-426, Mar. 9, 1994.*
The Annotated C++ Reference Manual ANSI Base Document, Margaret Ellis et al, pp. 341-385 and 397-399, Jun. 7, 1990.*
Beginning Visual C++ 5, Ivor Horton, Mar. 19, 1997, pp. 12, 60-69, 234-241, 529-533.*
Diagrammatic Functional Description of Microprocessor and Data-Flow Processor, Gotaro Odawara aet al, Jun. 1985, pp. 731-734.*
Symbol Manipulation in FORTRAN—SASP I Subroutines, M.J. Bailey et al, ACM, pp. 339-346, Jun. 1964.*

* cited by examiner

*Primary Examiner*—Todd Ingberg
(74) *Attorney, Agent, or Firm*—L. Jon Lindsay

(57) ABSTRACT

A set of programming macros implement bit-fields in a variable, such as an unsigned integer structure having a bit-field definition number associated with each bit-field. The bit-field definition numbers have a value that defines the associated bit-field in terms of its end bits. In various embodiments, the macros extract the end bits from the value of the structure elements to form mask and shift values with which to manipulate the bit-fields.

15 Claims, 4 Drawing Sheets

```
                    100
                       ↘
                      Struct
      102              {
          ↘ Unsigned int a : 1;
      104 ─→ Unsigned int b : 2;
      106 ─→ Unsigned int c : 8;
                      } abc
```

```
   108
      ↘ abc.b = value
   110 ─→ readvalue = abc.b
```

```
116 ──▶ Unsigned int abc;
118 ──▶ #define MASK_a  0001   // 0000000000000001
120 ──▶ #define MASK_b  0006   // 0000000000000110
122 ──▶ #define MASK_c  07f8   // 0000011111111000
124 ──▶ #define SHIFT_a 0000
126 ──▶ #define SHIFT_b 0001
128 ──▶ #define SHIFT_c 0003
```

Fig.4 (Prior Art)

```
130 ──▶ abc = (abc AND ~MASK_b) OR (value << SHIFT_b)

132 ──▶ readvalue = (abc AND MASK_b) >> SHIFT_b
```

Fig.5 (Prior Art)

|                                          |   |                      |
|-----------------------------------------:|---|----------------------|
| abc                                      | \| | YYYYYYYYYYYYYYYY ◀── 134 |
| ~MASK_b                                  | \| | 1111111111111001 ◀── 136 |
| abc AND ~MASK_b                          | \| | YYYYYYYYYYYYY00Y ◀── 138 |
| value                                    | \| | 0000000000000011 ◀── 140 |
| value << SHIFT_b                         | \| | 0000000000000110 ◀── 142 |
| (abc AND ~MASK_b) OR (value << SHIFT_b)  | \| | YYYYYYYYYYYYY11Y ◀── 144 |

Fig.6 (Prior Art)

200 → #define <name of bit-field> <BFDN>u

Fig.7

202    204
BFDN ← LEFT-BIT:RIGHT-BIT

Fig.8

```
212
 ↓
Struct              206
    {                │
        Unsigned long field;
        #define a 0000u
        #define b 0201u
        #define c 1003u
    } abc          /      \
                 208      210
```

Fig.9

```
214
 ↓
Struct              216
    {                │
        Unsigned long field;
        #define a 1010u
        #define b  908u
        #define c  700u
    } cba          /      \
                 218      220
```

Fig.10

222 → WRITE_BITFIELD(abc, b, value)

224 → readvalue = READ_BITFIELD(abc, b)

Fig.11

```
            ┌226
            #define LEFTBIT(BFDN)  (BFDN / 100)
            #define RIGHTBIT(BFDN) (BFDN % 100)
           └228
            #define FIELDMASK(BFDN) \
      └230      (~(fffe << (LEFTBIT(BFDN) - RIGHTBIT(BFDN))) << RIGHTBIT(BFDN))

#define READ_BITFIELD(ADDRESS, BFDN) \
      └232      ((ADDRESS AND FIELDMASK(BFDN)) >> RIGHTBIT(BFDN))

#define WRITE_BITFIELD(ADDRESS, BFDN, VALUE)           \
               (ADDRESS = ((ADDRESS AND ~FIELDMASK(BFDN)) |        \
      └234      ((VALUE << RIGHTBIT(BFDN)) AND FIELDMASK(BFDN))))
```

Fig.12

```
               236
               ↳ADDRESS     | abc = YYYYYYYYYYYYYYYY
        238──────►BFDN      | b = 0201
        240─────────►VALUE  | 3 = 0000000000000011
   242──►LEFTBIT(0201)      | 02
   244──►RIGHTBIT(0201)     | 01
   246──►FIELDMASK(0201)    |
              248──►LEFTBIT - RIGHTBIT  | 1
                  250──────►Fffe << 1   | 1111111111111100
                     252──────►~(Fffe << 1) | 0000000000000011
   256         254──►(~(Fffe << 1)) << 01   | 0000000000000110
   ↳WRITE_BITFIELD(abc,b,3):
                  258──────►~FIELDMASK              | 1111111111111001
               260──►abc AND ~FIELDMASK             | YYYYYYYYYYYY00Y
   264       262──►VALUE << RIGHTBIT                | 0000000000000110
   ↳{VALUE << RIGHTBIT} AND FIELDMASK               | 0000000000000110
                                        ►ADDRESS    | YYYYYYYYYYYY11Y
                                       266
```

Fig.13

COMPILER INDEPENDENT BIT-FIELD MACROS

FIELD

The subject matter herein relates to implementation of bit-fields in computer software. More specifically, the subject matter herein relates to a set of bit-field macros that can be used to implement compiler-independent bit-fields.

BACKGROUND

Sometimes programmers desire to subdivide a single "machine word" into multiple variables, each with a unique label, so that the subdivisions can be referenced like any other variable. The subdivisions of the machine word are commonly called "bit-fields." When the subdivided machine word is a memory space in system memory, or RAM, the compiler alone determines how the machine word is subdivided. However, when the subdivided machine word refers to hardware, such as a register in an integrated circuit (IC), it is the hardware design that determines the bit-field subdivision. Thus, the compiler's method of bit-field subdivision must match the hardware's method. Otherwise, software access to the hardware will read or write incorrect data. In some programming languages, such as C or C++, the method of bit-field subdivision is not standardized. In other words, each compiler vendor may implement bit-field subdivision in a different manner. Thus, using the actual bit-field technique of the programming language to read from or write to hardware (e.g. the registers in the IC) is unreliable and not portable between compilers from different vendors.

In the C programming language, bit-fields can only be applied to elements of a structure type, an example of which is shown in FIG. 1. In this example, a structure named "abc" 100 is defined to have three elements, or bit-fields 102, 104 and 106: a one-bit unsigned integer "a" 102, a two-bit unsigned integer "b" 104 and an eight-bit unsigned integer "c" 106.

Writing to and reading from the bit-fields is done using a conventional structure member operator, as shown in FIG. 2. For example, a write operation 108 writes an integer "value" to the bit-field b of the structure abc. A read operation 110 reads the contents of the bit-field b of the structure abc into an integer variable "readvalue."

The bits in the machine word that get assigned to each bit-field is dependent on the implementation of the compiler software that compiles the program into machine readable format. One compiler, for example, may assign the bit-fields "a" 102, "b" 104 and "c" 106 from the least significant bit to the most significant bit, as illustrated by a machine word 112 shown in FIG. 3. Another compiler, however, may assign the bit-fields "a" 102', "b" 104' and "c" 106' in the opposite order, as shown by another machine word 114. For physical bits or registers in the IC (not shown), however, the bits must correspond to the bit-fields 102, 104 and 106. Therefore, use of the compiler that assigns the bit-fields 102, 104 and 106 in the wrong order can cause errors in the operation of the IC when performing the write and read operations 108 and 110 (FIG. 2).

Typical work-arounds to this potential problem do not use actual bit-fields. Instead, they typically define "mask" and "shift" values for "pseudo" bit-fields of an unsigned integer variable. The pseudo bit-fields are isolated within the variable using AND, OR and SHIFT logical operators.

An example that implements the bit-fields 102–106 (FIGS. 1 and 3) in the machine word 112 (FIG. 3) as "pseudo" bit-fields in an unsigned integer variable "abc" 116 is shown in FIG. 4. "Define" statements 118, 120 and 122 define the "mask" values for the pseudo bit-fields a, b and c within the unsigned integer abc 116. The one-bit pseudo bit-field "a" occupies the bit-0 position in the machine word 112, so the mask value is 0001 (hex). The two-bit pseudo bit-field "b" occupies the bit-1 to bit-2 position in the machine word 112, so the mask value is 0006 (hex), as shown. The eight-bit pseudo bit-field "c" occupies the bit-3 to bit-10 position in the machine word 112, so the mask value is 07f8 (hex), as shown.

"Define" statements 124, 126 and 128 define the "shift" values for the pseudo bit-fields a, b and c. Since the pseudo bit-field "a" corresponds to the first bit (bit-0) of the machine word 112 (FIG. 3), pseudo bit-field "a" requires no shift value, i.e. the shift value is 0, as shown in define statement 124. Since the pseudo bit-field "b" starts after the first bit, pseudo bit-field "b" requires a shift value of 1, as shown in define statement 126. Since the pseudo bit-field "c" starts after the first three bits, pseudo bit-field "c" requires a shift value of 3, as shown in define statement 128.

A write operation 130, corresponding to the write operation 108 (FIG. 2), for writing a "value" into the pseudo bit-field "b" of the unsigned integer abc is shown in FIG. 5. Likewise, a read operation 132, corresponding to the read operation 110 (FIG. 2), for reading the current contents of the pseudo bit-field "b" into a variable "readvalue" is also shown.

An exemplary performance of the write operation 130 (FIG. 5) is illustrated by lines 134–144 in FIG. 6. The write operation 130 performs as a conventional "read-modify-write" operation. The current contents (line 134, all Y's denote retained values, 0 or 1) of the unsigned integer abc are read from the IC (not shown) and ANDed with the inverse of the "mask" value (line 136) for the pseudo bit-field "b" in order to zero-out the pseudo bit-field "b" (line 138). The "value" (line 140, e.g. 3, or 11 binary) is left-shifted by one bit (line 142) according to the "shift" value defined in define statement 126 (FIG. 4) and ORed with the zeroed-out unsigned integer abc (line 138) to insert the "value" into the pseudo bit-field "b" (line 144). The modified unsigned integer abc is written to the IC with only the pseudo bit-field "b" modified.

The pseudo bit-field technique requires the programmer to determine the "mask" and "shift" values, which is a time consuming and error prone process, especially when there may be hundreds of bit-fields, as is common in IC's today. Additionally, the resulting code is difficult to read and write. Writing the code is not intuitive to the programmer, so the technique is prone to coding errors.

It is with respect to these and other background considerations that the subject matter herein has evolved.

SUMMARY

In various embodiments claimed and described herein, the subject matter described herein involves a bit-field technique (e.g. a "pseudo" bit-field technique) using a variable that is effectively subdivided into bit-fields. Bit-field definition numbers are associated with each bit-field of the variable. The bit-field definition numbers define positions of end bits (e.g. left/right, upper/lower, etc.) of the bit-fields within the variable. Macros may use the bit-field definition numbers to extract a number for each of the end bits of the bit-fields and automatically generate "mask" and "shift" values therefrom. The generated mask and shift values may be used to isolate the bit-fields within the variable, such as when performing additional macros for reading from or writing to the bit-fields. Since the technique does not use "actual" bit-fields, the compiler-dependent problems are avoided. Additionally, since the technique uses macros to automatically generate the mask and shift values, many programmer errors related to determining the mask and shift values are avoided. Furthermore, inputs to the macros mimic the code used to form actual bit-fields, so the technique is intuitively understandable by programmers familiar with actual bit-field usage, thereby further avoiding many additional programmer errors.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

BRIEF DESCRIPTION OF THE DRAWINGS

FIG. 4 is exemplary prior art programming code for implementing an alternative variable to the structure and bit-fields shown in FIG. 1.

FIG. 5 is exemplary prior art programming code for writing to and reading from the alternative variable shown in FIG. 4.

FIG. 6 is exemplary prior art data resulting from executing the programming code shown in FIG. 5 for writing to the alternative variable shown in FIG. 4.

FIG. 7 is an exemplary format for programming code for implementing a bit-field according to the subject matter described herein.

FIG. 8 is an exemplary way to form a portion of the programming code shown in FIG. 7.

FIG. 9 is an exemplary structure having elements defined according to the exemplary format shown in FIG. 7.

FIG. 10 is another exemplary structure having elements defined according to the exemplary format shown in FIG. 7.

FIG. 11 is exemplary programming code for writing to and reading from the exemplary structures shown in FIGS. 9 and 10.

FIG. 12 is exemplary programming code for using the structures shown in FIGS. 9 and 10 in the exemplary programming code shown in FIG. 11.

FIG. 13 is exemplary data resulting from executing the programming code shown in FIG. 12 to write to the structure shown in FIG. 9.

DETAILED DESCRIPTION

Figures 1, 2, 3:
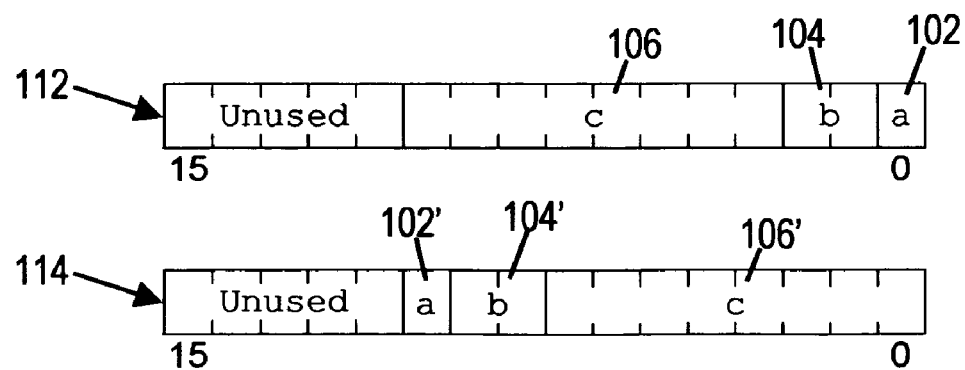
FIG. 1 is exemplary prior art programming code for a structure having bit-fields.
FIG. 2 is exemplary prior art programming code for writing to and reading from one of the bit-fields shown in FIG. 1.
FIG. 3 is a prior art block diagram of alternative compilations of the structure shown in FIG. 1.

A bit-field, according to the subject matter herein, is defined (i.e. implemented) by a bit-field definition number "BFDN," as shown in a format for a conventional "define" statement 200 shown in FIG. 7. The bit-field definition number BFDN is an unsigned (denoted by the "u") integer value assigned to a given bit-field, "<name of bit-field>," the <name of bit-field>being an "alias" for the BFDN. The bit-field definition number BFDN is formed, as shown in FIG. 8, by concatenating together numbers that denote the positions of end bits (e.g. left/right, upper/lower, etc.) 202 and 204 of the bit-field within a structure variable, or integer, corresponding to a machine word, such as for communicating between software and hardware (not shown) in an IC (integrated circuit), such as a microprocessor, (not shown).

The define statement 200 (FIG. 7) is used to set forth aliases (e.g. "a," "b" and "c") 206, 208 and 210 for bit-fields of a structure 212 (or an unsigned integer variable or other appropriate data type) of a given name (e.g. "abc"), as illustrated in a structure declaration shown in FIG. 9. The only member of the structure "abc" is an unsigned long data type with a name of "field." The structure "abc" 212 effectively forms the machine word 112 (FIG. 3) having the bit-fields corresponding to BFDN aliases "a" 102, "b" 104 and "c" 106 (FIG. 3) within however many bits (e.g. 8, 16, 32, 64, etc.) with which the hardware (not shown) and software operates.

The bit-field definition number BFDN (FIGS. 7 and 8) for the BFDN alias "a" 206 associated with the structure "abc" 212 is defined as 0000u, meaning that the BFDN alias "a" 206 is an alias for the unsigned integer value 0000. Thus, the first end bit (e.g. left, upper, etc.) of the bit-field "a" 102 (FIG. 3) that corresponds to the BFDN alias "a" 206 is at bit 0, and the second end bit (e.g. right, lower, etc.) of the bit-field "a" 102 is also at bit 0. In other words, the bit-field definition number BFDN alias "a" 206 for the bit-field "a" 102 defines a one-bit field at position 0 in the structure "abc" 212.

The bit-field definition number BFDN (FIGS. 7 and 8) for the BFDN alias "b" 208 associated with the structure "abc" 212 is defined as 0201u, meaning that the BFDN alias "b" 208 is an alias for the unsigned integer value 0201. Thus, the first end bit (e.g. left, upper, etc.) of the bit-field "b" 104 (FIG. 3) that corresponds to the BFDN alias "b" 208 is at bit 2, and the second end bit (e.g. right, lower, etc.) of the bit-field "b" 104 is at bit 1. In other words, the bit-field definition number BFDN alias "b" 208 for the bit-field "b" 104 defines a two-bit field between bits 1 and 2, inclusive, in the structure "abc" 212.

The bit-field definition number BFDN (FIGS. 7 and 8) for the BFDN alias "c" 210 associated with the structure "abc" 212 is defined as 1003u, meaning that the BFDN alias "c" 210 is an alias for the unsigned integer value 1003. Thus, the first end bit (e.g. left, upper, etc.) of the bit-field "c" 106 (FIG. 3) that corresponds to the BFDN alias "c" 210 is at bit 10, and the second end bit (e.g. right, lower, etc.) of the bit-field "c" 106 is at bit 3. In other words, the bit-field definition number BFDN alias "c" 210 for the bit-field "c" 106 defines an eight-bit field between bits 10 and 3, inclusive, in the structure "abc" 212.

An alternative structure 214 of a given name "cba," illustrating how the order of the bit-fields may be intentionally assigned in reverse order, is shown in FIG. 10. The structure "cba" 214 effectively forms the machine word 114 (FIG. 3) having the bit-fields "a" 102', "b" 104' and "c" 106' (FIG. 3).

The bit-field definition number BFDN (FIGS. 7 and 8) for a BFDN alias "a" 216 associated with the structure "cba" 214 is defined as 1010u, meaning that the BFDN alias "a" 216 is an alias for the unsigned integer value 1010. Thus, the first end bit (e.g. left, upper, etc.) of the bit-field "a" 102' (FIG. 3) that corresponds to the BFDN alias "a" 216 is at bit 10, and the second end bit (e.g. right, lower, etc.) of the bit-field "a" 102' is also at bit 10. In other words, the bit-field definition number BFDN alias "a" 216 for the bit-field "a" 102' defines a one-bit field at bit 10, in the structure "cba" 214.

The bit-field definition number BFDN (FIGS. 7 and 8) for the BFDN alias "b" 218 associated with the structure "cba" 214 is defined as 908u, meaning that the BFDN alias "b" 218 is an alias for the unsigned integer value 908. Thus, the first end bit (e.g. left, upper, etc.) of the bit-field "b" 104' (FIG. 3) that corresponds to the BFDN alias "b" 218 is at bit 9, and the second end bit (e.g. right, lower, etc.) of the bit-field "b" 104' is at bit 8. In other words, the bit-field definition number BFDN alias "b" 218 for the bit-field "b" 104' defines a two-bit field between bits 8 and 9, inclusive, in the structure "cba" 214.

The bit-field definition number BFDN (FIGS. 7 and 8) for the BFDN alias "c" 220 associated with the structure "cba" 214 is defined as 700u, meaning that the BFDN alias "c" 220 is an alias for the unsigned integer value 700. Thus, the first end bit (e.g. left, upper, etc.) of the bit-field "c" 106' (FIG. 3) that corresponds to the BFDN alias "c" 220 is at bit 7, and the second end bit (e.g. right, lower, etc.) of the bit-field "c" 106' is at bit 0. In other words, the bit-field definition number BFDN alias "c" 220 for the bit-field "c" 106' defines an eight-bit field between bits 7 and 0, inclusive, in the structure "cba" 214.

As shown in FIG. 11, exemplary macros 222 and 224 (WRITE_BITFIELD and READ_BITFIELD, defined below), or other appropriate programming code techniques, may be called in order to write to and read from any one of the bit-fields (e.g. the bit-field "b" 104, FIG. 3) in the structure (e.g. "abc" 212, FIG. 9). The WRITE_BITFIELD macro 222, for example, uses as parameters the name of the structure (e.g. "abc" 212), the bit-field definition number BFDN alias (e.g. "b" 208, FIG. 9) for the target bit-field, and the "value" to be written to the target bit-field. The order of these parameters ("abc," "b" and "value") in the WRITE_BITFIELD macro 222 is the same as the designations required for the write operation 108 (FIG. 2) used with conventional bit-fields, as described above. Therefore, a programmer familiar with the usage of the write operation 108 will intuitively grasp the usage of the WRITE_BITFIELD macro 222.

The READ_BITFIELD macro 224, likewise, uses as parameters the name of the structure (e.g. "abc" 212) and the bit-field definition number BFDN alias (e.g. "b" 208, FIG. 9) for the target bit-field, and supplies the current value of the target bit-field to a variable "readvalue." The order of the variable "readvalue" and the parameters ("abc" and "b") for the READ_BITFIELD macro 224 is the same as the designations required for the read operation 110 (FIG. 2) used with conventional bit-fields, as described above. Therefore, as with the WRITE_BITFIELD macro 222, a programmer familiar with the usage of the read operation 110 will intuitively grasp the usage of the READ_BITFIELD macro 224.

Lines of programming code 226, 228, 230, 232 and 234, shown in FIG. 12, illustrate exemplary usage of the structure "abc" 212 (FIG. 9) and the bit-field definition numbers BFDN's (FIGS. 7 and 8) corresponding to the bit-fields "a" 102, "b" 104 and "c" 106 (FIG. 3) for implementing bit-fields with the WRITE_BITFIELD and READ_BITFIELD macros 222 and 224 (FIG. 11). For example, the end bits (e.g. left/right, upper/lower, etc.) 202 and 204 (FIG. 8) are extracted from the bit-field definition number BFDN (via the BFDN alias) by a LEFTBIT macro defined in line 226 and a RIGHTBIT macro defined in line 228. The LEFTBIT macro (line 226) uses the bit-field definition number BFDN as a parameter and performs a conventional "divide operation" on the bit-field definition number BFDN by 100. The divide operation does not return any "remainder" from the division. Therefore, in the case of the BFDN alias "b" 208, the value defined in FIG. 9 is 0201, so the divide operation discards the remainder of 01 and returns only the value 02. Likewise, the RIGHTBIT macro (line 228) uses the bit-field definition number BFDN as a parameter, but performs a conventional remainder operation on the bit-field definition number BFDN divided by 100. The remainder operation returns only the remainder from the division. Therefore, in the case of the BFDN alias "b" 208, the remainder operation discards the value of 02 and returns only the remainder of 01.

Using the LEFTBIT macro (line 226) and the RIGHTBIT macro (line 228), a "mask" is generated of the desired bit-field in the structure (e.g. "abc" 212, FIG. 9) by a FIELDMASK macro (line 230). The FIELDMASK macro (line 230) uses the bit-field definition number BFDN alias as an input parameter. The FIELDMASK macro (line 230) uses the LEFTBIT and RIGHTBIT macros (lines 226 and 228) to extract the end bits of the desired bit-field and forms a "shift value" from the difference thereof. The shift value is applied to an initial mask value having bits containing all logical 1's, except for one logical 0 in the right-most bit (e.g. fffe) to left shift the bits of the initial mask value, until the mask value has logical 0's in a field as wide as the desired bit-field. The initial mask value preferably has the same number of bits as the desired structure (e.g. "abc" 212, FIG. 9). The mask value is then inverted, so that it has logical 1's in the field as wide as the desired bit-field. The mask value is then left shifted by the amount of the right bit, as extracted by the RIGHTBIT macro (line 228), to place the field of logical 1's in the mask value in the same position as the desired bit-field in the structure (e.g. "abc"). The mask thus generated is used to isolate the desired bit-field for the WRITE_BITFIELD and READ_BITFIELD macros 222 and 224 (FIG. 11).

Using the FIELDMASK macro (line 230) and the RIGHTBIT macro (line 228), the READ_BITFIELD macro (line 232; and 224, FIG. 11) extracts the current value of the desired bit-field from the structure (e.g. "abc," FIG. 9). The READ_BITFIELD macro (line 232) uses as input parameters an "address" (i.e. the name) of the desired structure (e.g. "abc") and the bit-field definition number BFDN alias corresponding to the desired bit-field within the structure. The FIELDMASK macro (line 230) is used to generate a mask for the given bit-field definition number BFDN. The current value of the structure (e.g. "abc") defined by the "address" parameter is read from the hardware (not shown), and the mask is logically ANDed with the current value, thereby zeroing-out the bits of the structure (e.g. "abc") that are not part of the desired bit-field. The ANDed result is right shifted by the amount of the right-bit 204 (FIG. 8) extracted by the RIGHTBIT macro (line 228) to form the desired bit-field value. The value thus extracted may be placed into the variable "readvalue" (FIG. 11).

Using the FIELDMASK macro (line 230) and the RIGHTBIT macro (line 228), the WRITE_BITFIELD macro (line 234; and 222, FIG. 11) inserts a "value" into the desired bit-field of the structure (e.g. "abc," FIG. 9). The WRITE_BITFIELD macro (line 234) uses as input parameters the "address" (i.e. the name) of the desired structure (e.g. "abc"), the bit-field definition number BFDN alias corresponding to the desired bit-field within the structure and the "value" to be inserted into the desired bit-field. The FIELDMASK macro (line 230) is used to generate a mask for the given bit-field definition number BFDN. The current value of the structure (e.g. "abc") defined by the "address" parameter is read from the hardware (not shown), and the mask is inverted and logically ANDed with the current value, thereby zeroing-out the bits of the structure (e.g. "abc") that are part of the desired bit-field. The "value" to be inserted into the desired bit-field is then left shifted by the amount of the right bit as extracted from the bit-field definition number BFDN by the RIGHTBIT macro (line 228), so that the relevant bits in the "value" are positioned the same as the desired bit-field in the structure (e.g. "abc"). To ensure that the number of bits in the "value" do not exceed the number of bits in the bit-field, the shifted "value" is ANDed with the mask generated by the FIELDMASK macro (line 230). The shifted "value" is then logically ORed with the structure (e.g. "abc") having the zeroed-out bits of the desired bit-field. The result is then placed back into the structure (e.g. "abc") defined by the "address" parameter and thereby written back into the hardware (not shown).

An exemplary performance of the WRITE_BITFIELD macro 222 (FIG. 11, see also line 234, FIG. 12) comparable to the exemplary performance of the write operation 130 (FIG. 5, illustrated in FIG. 6) is shown in FIG. 13. Data resulting at each step of the WRITE_BITFIELD macro 222 (line 234) is shown in lines 236–266 for the exemplary "value" to be written to the bit-field "b" 104 (FIG. 3) in the structure "abc" (FIG. 9).

The current value of the structure "abc" 212 (FIG. 9) as determined by the "address" provided to the WRITE_BITFIELD macro 222 (FIG. 11, see also line 234, FIG. 12) is retrieved from the hardware (not shown) at line 236. The Y's denote retained values for the bits of the current value of the structure "abc" 212, similar to the contents (line 134, FIG. 6) of the unsigned integer abc (FIG. 6) described above. The value of the BFDN alias "b" 208 (FIG. 9) associated with the structure "abc" 212 is 0201, the bit-field definition number BFDN for the desired bit-field "b" 104 (FIG. 3) in the structure "abc" 212, as shown in line 238 (see also FIG. 9). The "value" to be written to the desired bit-field "b" 104 in this example is selected to be "3," or 0000000000000011 (binary), as shown at line 240.

When the LEFTBIT macro (line 226, FIG. 12) is used (e.g. by the FIELDMASK macro, line 230, FIG. 12) and supplied the BFDN value 0201 (via the BFDN alias "b" 208, FIG. 9), the left bit "02" is extracted, as shown at line 242. When the RIGHTBIT macro (line 228, FIG. 12) is used (e.g. by the FIELDMASK macro, line 230, or the WRITE_BITFIELD macro, line 234, FIG. 12) and supplied the BFDN value 0201, the right bit "01" is extracted, as shown at line 244.

When the FIELDMASK macro (line230, FIG. 12) is used (e.g. by the WRITE_BITFIELD macro, line 234, FIG. 12) and supplied the BFDN value 0201, as shown at line 246, the FIELDMASK macro (line 230) proceeds as shown in lines 248–254. The difference between the left bit "02" and the right bit "01" is "1" (line 248). The "1" is used to left shift the initial mask value of "fffe" (line 250), so that there are 0's in the two right-most bits of the mask value. The two 0-bits are the width of the desired bit-field. The left shifted mask value is inverted (line 252), so that there are 1's only in the two right-most bits of the mask value. The inverted mask value is left shifted by the value of the right bit "01" to place the two 1-bits at the location of the desired bit-field "b" 104 (FIG. 3) in the structure "abc" 212 (FIG. 9), thereby forming the mask of the desired bit-field "b" 104 (line 254).

The WRITE_BITFIELD macro (line 234, FIG. 12) is supplied (line 256) the "address" of the structure "abc" 212 (FIG. 9), the BFDN value (via the alias "b" 208, FIG. 9) for the desired bit-field "b" 104 (FIG. 3) in the structure "abc" 212, and the "value" (e.g. "3") to be written to the desired bit-field "b" 104. The WRITE_BITFIELD macro (line 234) uses the FIELDMASK macro (line 230, FIG. 12) to obtain the mask for the desired bit-field "b" 104 and inverts the mask at line 258, similar to the inverse of the "MASK_b" value (line 136, FIG. 6) described above. The current value of the structure "abc" 212 is retrieved and ANDed with the inverted mask at line 260, similar to the line 138 (FIG. 6) described above, to zero-out the desired bit-field "b" 104 in the structure "abc" 212. The "value" of "3" (0000000000000011, binary) is left shifted by the value of the right bit "01", as shown in line 262, to place the relevant 2-bit portion of the "value" in the same location as the desired bit-field "b" 104, similar to the line 142 (FIG. 6) described above. The shifted "value" is ANDed with the mask, as generated by the FIELDMASK macro (line 230), to ensure that the number of bits in the shifted "value" do not exceed the number of bits in the bit-field "b" 104, as shown in line 264. The shifted "value" (line 264) is ORed with the structure "abc" 212 having the zeroed-out bits (line 260) to place the "value" in the desired bit-field "b" 104 in the structure "abc" 212, which is written to the hardware "address" of the structure "abc" 212, as shown in line 266, similar to the line 144 (FIG. 6) described above.

In this manner, the "value" is written to the desired bit-field using additional steps (over those shown in the prior art above) in the WRITE_BITFIELD macro (line 234, FIG. 12) that automatically generate the mask and shift values, with the advantage of reducing the likelihood of programmer error. Likewise, the READ_BITFIELD macro (line 232, FIG. 12) has the same advantage. The WRITE_BITFIELD and the READ_BITFIELD macros use inputs that almost mimic the form, or order, of actual bit-field usage in the programming language, thereby capitalizing on programmer familiarity with actual bit-field usage to further reduce the likelihood of programmer error. One of the inputs is the bit-field definition number BFDN (FIG. 8), which is a simple concatenation of the left-bit and right-bit numbers for the bit-field. Thus, instead of having to calculate mask and shift values, the programmer only has to know the range of the bit-fields within the structure (e.g. "abc" 212, FIG. 9, and "cba" 214, FIG. 10) in order to program with the macros.

Presently preferred embodiments of the subject matter herein and its improvements have been described with a degree of particularity. This description has been made by way of preferred example. It should be understood that the scope of the claimed subject matter is defined by the following claims, and should not be unnecessarily limited by the detailed description of the preferred embodiments set forth above.

What is claimed is:

1. A method executing on a computer and stored on a computer readable medium for implementing bit-fields for a machine word for use with compiler independent bit-field macros, comprising:

defining a variable corresponding to the machine word;

defining at least one bit-field within the variable, the bit-field having a first bit and a second bit;

for each bit-field, determining a first bit number defining a position of the first bit of the bit-field within the variable;

for each bit-field, determining a second bit number defining a position of the second bit of the bit-field within the variable; and for each bit-field, concatenating the first bit number and second bit number together to form a bit-field definition number defining a location of the bit-field within the variable.

2. A method as defined in claim 1, wherein the variable includes a structure, further comprising:
defining the variable in a structure declaration; and
for each bit-field, defining an alias for the bit-field definition number within the structure declaration.

3. A method as defined in claim 1 further comprising:
for each bit-field, determining the first bit number by determining a left bit of the bit-field; and
for each bit-field, determining the second bit number by determining a right bit of the bit-field.

4. A method as defined in claim 1 further comprising:
selecting one of the at least one bit-field from which data is to be read;
extracting the first and second bit numbers from the bit-field definition number for the selected bit-field;
generating a mask of the variable from the extracted first and second bit numbers to isolate the selected bit-field;
using the mask to zero-out all bits of the variable except for within the selected bit-field; and
using one of the first and second bit numbers to shift the selected bit-field to form the data to be read.

5. A method as defined in claim 1 further comprising:
selecting one of the at least one bit-field to which data is to be written;
providing a write value to be written into the selected bit-field;
extracting the first and second bit numbers from the bit-field definition number for the selected bit-field;
generating a mask of the variable from the extracted first and second bit numbers to isolate the selected bit-field;
using the mask to zero-out all bits of the variable only within the selected bit-field;
using one of the first and second bit numbers to shift the write value to the location of the selected bit-field; and
inserting the write value into the selected bit-field.

6. A method as defined in claim 1 further comprising:
selecting one of the at least one bit-field for which a mask is to be formed;
extracting the first and second bit numbers from the bit-field definition number for the selected bit-field;
subtracting the second bit number from the first bit number to form a first shift value;
providing a mask value having one bit of a first logical value and remaining bits of a second logical value, the first logical value bit being an end bit of the initial value;
shifting the first logical value bit from the end bit of the mask value by the first shift value, all bits between the first logical value bit and the end bit inclusive being first logical value bits, and the remaining bits having the second logical value;
inverting all of the bits of the mask value, the first logical value bits becoming the second logical value bits, and the remaining bits having the first logical value; and
forming the mask for the selected bit-field by using the second bit number as a second shift value and shifting the second logical value bits from the end bit of the mask value by the second shift value, all bits between the second logical value bits and the end bit having the first logical value.

7. A method as defined in claim 1 further comprising:
selecting one of the at least one bit-field;
extracting the first bit number from the bit-field definition number for the selected bit-field by dividing the bit-field definition number by a divisor and discarding any remainder from the division; and
extracting the second bit number from the bit-field definition number for the selected bit-field by dividing the bit-field definition number by the divisor and discarding any non-remainder from the division.

8. A method as defined in claim 7 wherein the divisor is 100.

9. A method executing on a computer and stored on a computer readable medium of handling a bit-field for a machine word for use with compiler independent bit-field macros, comprising:
defining a machine word having a plurality of bits including a bit-field located from a first one of the bits to a second one of the bits in the machine word;
forming a bit-field definition number having a first portion and a second portion, the first portion formed from a location of the first bit in the machine word, the second portion formed from a location of the second bit in the machine word, the bit-field definition number defining a location and range of the bit-field in the machine word; and
associating the bit-field definition number with the bit-field in the machine word.

10. A method as defined in claim 9 further comprising:
forming the bit-field definition number by concatenating a number of the first bit and a number of the second bit together, the first portion and the second portion representing the numbers of the first and second bits, respectively.

11. A method as defined in claim 10 further comprising:
retrieving the number of the first bit from the first portion of the bit-field definition number by dividing the bit-field definition number by a divisor and discarding any remainder; and
retrieving the number of the second bit from the second portion of the bit-field definition number by dividing the bit-field definition number by the divisor and discarding any non-remainder.

12. A method as defined in claim 9 further comprising:
extracting the first and second portions from the bit-field definition number; and
generating a mask of the bit-field in the machine word from the extracted first and second portions.

13. A method as defined in claim 12 further comprising:
generating the mask of the bit-field in the machine word by:
calculating a difference between the extracted first and second portions of the bit-field definition number;
shifting a predetermined value by the calculated difference;
inverting the shifted predetermined value; and
shifting the inverted shifted predetermined value by the second portion of the bit-field definition number.

14. A method as defined in claim 12 further comprising:
reading a current value of the bit-field by:
ANDing the machine word with the generated mask to form an ANDed result having all the bits of the machine word outside of the bit-field zeroed-out; and
shifting the ANDed result by the second portion of the bit-field definition number.

15. A method as defined in claim 12 further comprising:
writing a write value to the bit-field by:
inverting the generated mask;
logically ANDing the machine word with the inverted generated mask to form an ANDed result having the bits of the machine word only within the bit-field zeroed-out;
shifting the write value by the second portion of the bit-field definition number; and
logically ORing the shifted write value with the ANDed result.

* * * * *